(No Model.)

A. PRESTON.
DRAFT EQUALIZER.

No. 496,443. Patented May 2, 1893.

Witnesses:
Ray Hutchins.
Herbert Cowell.

Inventor:
Alexander Preston By
Thos. H. Hutchins
Attorney.

UNITED STATES PATENT OFFICE.

ALEXANDER PRESTON, OF GOODFARM, ILLINOIS.

DRAFT-EQUALIZER.

SPECIFICATION forming part of Letters Patent No. 496,443, dated May 2, 1893.

Application filed December 27, 1892. Serial No. 456,511. (No model.)

*To all whom it may concern:*

Be it known that I, ALEXANDER PRESTON, a citizen of the United States of America, residing at Goodfarm, in the county of Grundy and State of Illinois, have invented certain new and useful Improvements in Draft-Equalizers, of which the following is a specification, reference being had therein to the accompanying drawings and the letters of reference thereon, forming a part of this specification, in which—

Figure 1:
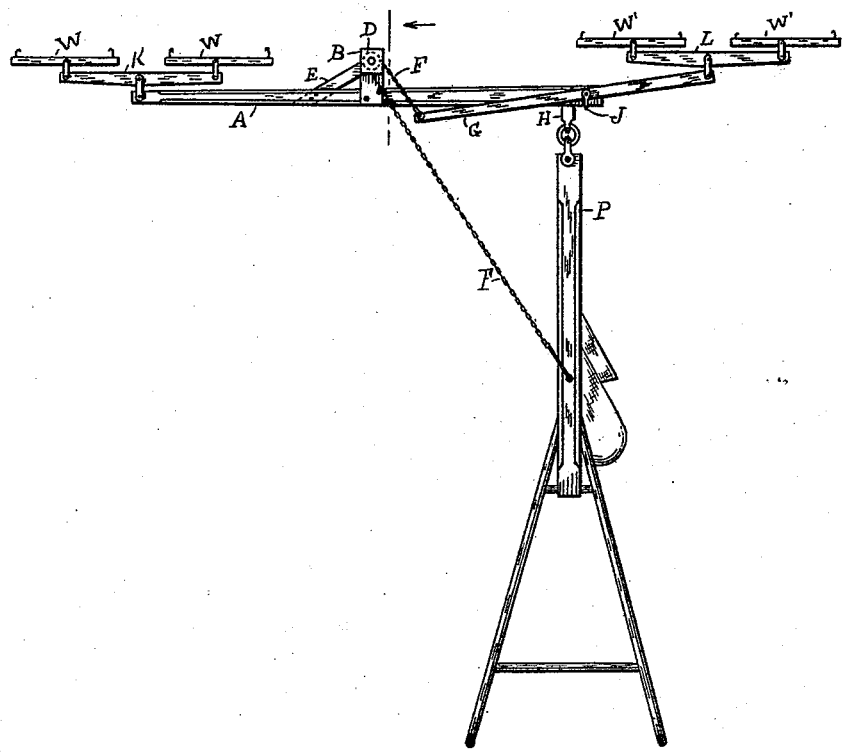
Figure 2:
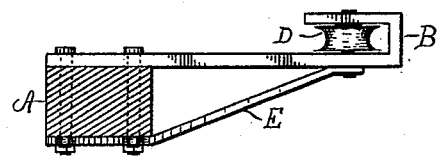

Figure 1 is a plan view showing the draft equalizer as it would appear attached to a plow, and Fig. 2 is a cross section of Fig. 1, taken on line 1 looking in the direction of the arrow.

This invention relates to certain improvements in draft equalizers, which improvements are fully set forth and explained in the following specification and claim.

Referring to the drawings A represents a doubletree, having connected to one end in the ordinary manner a doubletree K provided with whiffletrees W. W., and having pivotally connected to it at its opposite end a whiffletree G by means of the clevis J, said whiffletree G having its point of pivot to doubletree A nearest its outer end.

L is a doubletree connected to the outer end of the whiffletree G, and is provided with the whiffletrees W' W'.

B is an arm secured at its inner end to the upper side of doubletree A at about its center, and extends out forward, and is held securely in place by means of a brace E. The outer end of arm B is provided with a sheave wheel D around which passes the chain F, having one end connected to the inner end of whiffletree G, and its opposite end to the plow P at about the upper end of its standard.

H is an arm secured to the under side of doubletree A at its end having whiffletree G, which arm extends rearward and terminates in a hook, to hook into a clevis on the outer end of the plow beam, so that the plow is connected to the equalizer at two points viz. at the outer end of the beam, and toward its rear end at or near its standard.

The equalizer is shown in this instance as attached to a plow, but it may as well be attached to any other object with the same result or effect.

Having thus described my invention, what I claim as new, and desire to secure by Letters Patent, is as follows, to wit:

A draft equalizer comprising the combination of the doubletree A having its inner end provided with the rearwardly extending hooked arm H for connecting said doubletree with the outer end of the plow beam, and having the forwardly extending arm B located at about its center, and having the sheave wheel D, doubletree K having whiffletrees W. W. connected to the outer end of doubletree A, whiffletree G pivotally connected to doubletree A at its inner end, doubletree L having whiffletrees W' W' and connected to the outer end of whiffletree G, and chain F having its inner end connected to the inner end of whiffletree G and passing around sheave wheel D and connected at its outer end to the plow at or near its standard, all arranged to operate substantially as and for the purpose set forth.

ALEXANDER PRESTON.

Witnesses:
W. G. TAYLOR,
MILTON S. DEWEY.